(12) United States Patent
Larkin et al.

(10) Patent No.: US 12,513,223 B2
(45) Date of Patent: Dec. 30, 2025

(54) INTELLIGENT MESSAGE FILTERING AND FORWARDING USING CROSS PLATFORM INTERFACES

(71) Applicant: Optum, Inc., Minnetonka, MN (US)

(72) Inventors: Kevin Larkin, Kildare (IE); Claudia Burri Devereux, Scottsdale, AZ (US); Eric Brian Tal, Northbrook, IL (US); David Scott Bachert, Brentwood, TN (US)

(73) Assignee: Optum, Inc., Minnetonka, MN (US)

( * ) Notice: Subject to any disclaimer, the term of this patent is extended or adjusted under 35 U.S.C. 154(b) by 26 days.

(21) Appl. No.: 18/543,796

(22) Filed: Dec. 18, 2023

(65) Prior Publication Data

US 2025/0202993 A1 Jun. 19, 2025

(51) Int. Cl.
*H04L 67/55* (2022.01)
*H04L 67/566* (2022.01)

(52) U.S. Cl.
CPC ............ *H04L 67/55* (2022.05); *H04L 67/566* (2022.05)

(58) Field of Classification Search
CPC .............................. H04L 67/55; H04L 67/566
USPC ........................................................ 709/224
See application file for complete search history.

(56) References Cited

U.S. PATENT DOCUMENTS

| | | | |
|---|---|---|---|
| 8,321,243 B1 * | 11/2012 | Harris, Sr. | G16H 20/10 705/3 |
| 8,335,672 B1 | 12/2012 | Ringold | |
| 2013/0138453 A1 | 5/2013 | Kuhn | |
| 2014/0343960 A1 | 11/2014 | Christensen et al. | |

OTHER PUBLICATIONS

Srakocic, S., "Medicare Secondary Payer: When Is Medicare Primary or Secondary?", healthline, May 29, 2020, (25 pages), https://www.healthline.com/health/medicare/medicare-secondary-payers.

* cited by examiner

*Primary Examiner* — Suraj M Joshi
(74) *Attorney, Agent, or Firm* — Alston & Bird LLP

(57) ABSTRACT

Various embodiments of the present disclosure provide message filtering and routing techniques for intelligently routing messages within a complex network domain. The techniques may include receiving, originating from a provider system, a provider-platform request message that identifies a provider service request and a designated coverage platform corresponding to the provider service request. In response to an identification of a designation error associated with the designated coverage platform, the techniques may include providing to a primary coverage platform, using a cross-platform interface, a platform-platform request message that identifies the provider service request; and providing an alert message to the provider system.

20 Claims, 7 Drawing Sheets

INTELLIGENT MESSAGE FILTERING AND FORWARDING USING CROSS PLATFORM INTERFACES

BACKGROUND

Various embodiments of the present disclosure address technical challenges related to message filtering and routing in complex network domains, such as those involving multi-party hierarchical relationships. Communication techniques in such domains are traditionally limited by the network infrastructure used to communicatively connect entities within the domain. For example, entity-entity collaboration within a network domain may be performed using entity-entity interfaces that govern the use and form of messages passed between entities. In some network domains, collaboration is limited to two-way messaging channels between entities connected by an established entity-entity interface. In such a case, messages that involve three parties must be routed and rerouted between the three parties in a complex series of redundant messages. Such processes increase the time, cost, and number of touchpoints necessary for completing network communications.

As one example of these technical problems, a healthcare network domain, in which a healthcare provider submits a claim for processing by an insurance platform, may involve a number of healthcare providers that may individually interact with a number of insurance platforms. Traditionally, messages between a provider and a platform are performed using two-way communication channels such that a provider must act as an intermediary between a plurality of different platforms. For instance, if a claim is denied by a first platform due to coordination of benefits (COB) issues, the claim must be rerouted to the provider who must then resubmit the claim to a different platform. In such a case, the message submitting the claim to the first platform is redundant, which increases the time, cost, and number of touchpoints necessary for ultimately resolving the claim.

Various embodiments of the present disclosure make important contributions to traditional communication techniques by addressing these technical challenges, among others.

BRIEF SUMMARY

Various embodiments of the present disclosure provide message filtering and routing techniques that improve traditional communication techniques, such as those used in complex network domains involving multi-party hierarchical relationships. To do so, some embodiments of the present disclosure leverage multifaceted interfaces to enable a private exchange among three or more involved parties. For instance, a computing system may receive, through a first interface, a request message originating from a provider system that identifies the computing system as the designated system for processing the message. In response to a designation error, the computing system may leverage a second, cross platform interface to provide the request message to an appropriate system. Rather than returning the request message to the provider system, the computing system may provide an alert message indicating that the request message has been rerouted. In this manner, the interfaces of the present disclosure may enable a system that receives a traditionally redundant message to filter and reroute a message to an appropriate system for processing. This, in turn, decreases the time, cost, and number of touchpoints necessary for ultimately resolving the message, thereby reducing the consumption of processing and memory resources devoted to communications within complex network domains.

In some embodiments, a computer-implemented method includes receiving, by one or more processors and originating from a provider system, a provider-platform request message that identifies a provider service request and a designated coverage platform corresponding to the provider service request; and in response to an identification of a designation error associated with the designated coverage platform, (i) providing to a primary coverage platform, by the one or more processors and using a cross-platform interface, a platform-platform request message that identifies the provider service request; and (ii) providing, by the one or more processors, an alert message to the provider system.

In some embodiments, a computing system includes memory and one or more processors communicatively coupled to the memory, the one or more processors are configured to receive, originating from a provider system, a provider-platform request message that identifies a provider service request and a designated coverage platform corresponding to the provider service request; and in response to an identification of a designation error associated with the designated coverage platform, (i) provide to a primary coverage platform, using a cross-platform interface, a platform-platform request message that identifies the provider service request; and (ii) provide an alert message to the provider system.

In some embodiments, one or more non-transitory computer-readable storage media include instructions that, when executed by one or more processors, cause the one or more processors to receive, originating from a provider system, a provider-platform request message that identifies a provider service request and a designated coverage platform corresponding to the provider service request; and in response to an identification of a designation error associated with the designated coverage platform, (i) provide to a primary coverage platform, using a cross-platform interface, a platform-platform request message that identifies the provider service request; and (ii) provide an alert message to the provider system.

DETAILED DESCRIPTION

Figure 1:
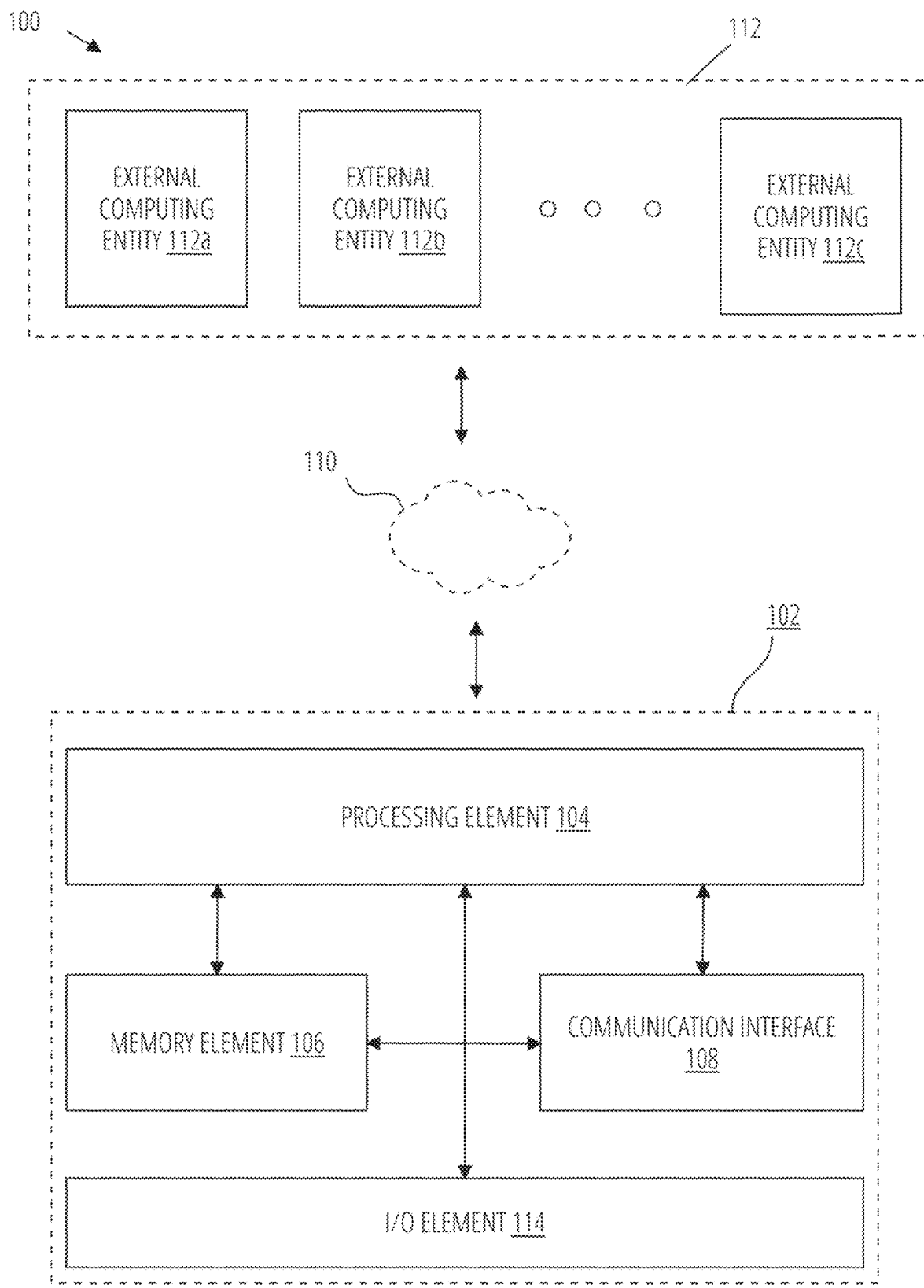
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., message filtering techniques, message routing techniques, and/or the like) described herein.

The external computing entities 112a-c, for example, may include and/or be associated with one or more entities that may be configured to receive, store, manage, and/or facilitate datasets, such as the entity coverage dataset, and/or the like. The external computing entities 112a-c may provide such datasets, and/or the like to the predictive computing entity 102 which may leverage the datasets to identify designation deviations, reroute messages, and/or the like, as described herein. In some examples, the datasets may include an aggregation of data from across the external computing entities 112a-c into one or more aggregated datasets. The external computing entities 112a-c, for example, may be associated with one or more data repositories, cloud platforms, compute nodes, organizations, and/or the like, which may be individually and/or collectively leveraged by the predictive computing entity 102 to obtain and aggregate data for a prediction domain.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
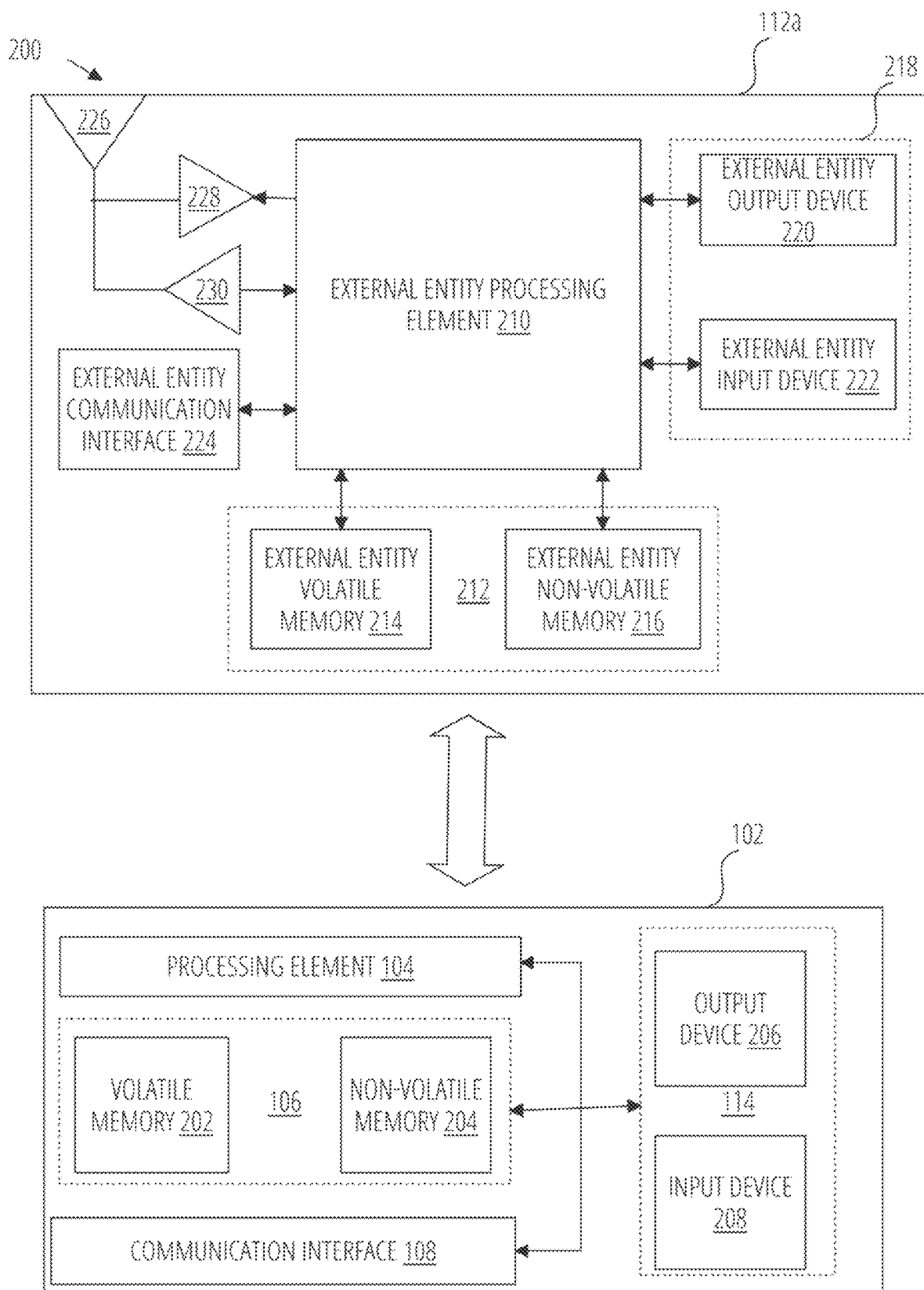
FIG. 2 is a schematic diagram showing a system computing architecture in accordance with one or more embodiments of the present disclosure.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product which includes non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLES OF CERTAIN TERMS

In some embodiments, the term "network domain" refers to a network of entities that may communicate, using some of the techniques of the present disclosure, to facilitate one or more real world services. A network domain may communicatively connect a plurality of different entities through one or more networking channels, interfaces, messaging schema, and/or the like. Each of the different entities may be associated with a particular aspect of a real-world service. For instance, the different entities may include a plurality of recipient entities that receive a service, a plurality of provider entities that provide a service, and/or a plurality of platform entities that facilitate the service on behalf of the recipient entities. Each of the entities may communicate, via respective computing systems and using one or more wired and/or wireless networks to facilitate the service. In some examples, the plurality of entities may be related through one or more complex relationships that, as described herein, are inefficiently handled by traditional communication mechanisms within a network domain.

An example of a network domain may include a COB healthcare domain in which a patient (e.g., recipient entity) receives a healthcare service from a healthcare provider (e.g., provider entity) that is compensated for by one or more insurance platforms (e.g., platform entities) based on the patient's membership with the one or more insurance platforms. The potential for multiple hierarchical platform relationships with a patient adds layers of complexity, time, and cost to the provider-payer relationship. A COB transaction is an industry standard practice used to share the cost of care between two or more platforms when a member is covered by more than one health benefit plan. In such a case, different governing guidelines (e.g., National Association of Insurance Commissioner (NAIC) guidelines, Centers for Medicare & Medicaid Services (CMS), etc.) are individually used by each platform to determine which platform is primary for a medical claim from a healthcare provider. In the event that a platform is not the primary paying platform for a medical claim, the medical claim is denied and sent back to the healthcare provider. The healthcare provider then provides the same claim to the primary paying platform. This multi-step process causes delays in the processing of services and increased costs for all entities involved in a network domain. Some embodiments of the present disclosure may address these deficiencies using new entity-entity interfaces and automatic rerouting mechanisms that improve the transfer of data across entities within a network domain, such as the COB healthcare domain.

In some embodiments, the term "provider system" refers to a computing system associated with a provider entity. A provider system, for example, may include an example computing entity, including one or processors and/or memory storing instructions that, when executed by the one or more processors, cause the computing entity to perform one or more operations described herein. In some examples, a provider system may include a user device, such as a mobile phone, desktop computer, laptop, and/or the like. In addition, or alternatively, a provider system may include at least a portion of a cloud server, such as a user account, and/or the like that is associated with a provider entity. By way of example, in a COB network domain, a provider system may include a computing entity that is accessible by a healthcare provider for creating, submitting, and/or revising medical claims.

In some embodiments, the term "platform system" refers to a computing system associated with a platform entity. A platform system, for example, may include an example computing entity, including one or processors and/or memory storing instructions that, when executed by the one or more processors, cause the computing entity to perform one or more operations described herein. In some examples, a platform system may include a user device, such as a mobile phone, desktop computer, laptop, and/or the like. In addition, or alternatively, a platform system may include at least a portion of a cloud server, such as a user account, and/or the like that is associated with a platform entity. By way of example, in a COB network domain, a platform system may include a computing entity that is accessible by an insurance platform for receiving, processing, and/or rerouting medical claims.

In some embodiments, the term "platform message interface" refers to a frontend interface of a platform system. The platform message interface may include one or more application programing interface (API) gateways configured to receive and/or provide messages from/to one or more external entities with a network domain, such as a provider system, another platform system, and/or the like. In some examples, the platform message interface may include one or more transparent network APIs for communicating with one or more different entities within the network domain. In some examples, a platform message interface may include a first transparent network API, such as a provider-platform interface, for communicating with one or more provider systems and/or a second transparent network API, such as a cross-platform interface, for communicating with one or more other platform systems.

For example, a platform message interface may include a provider-platform interface, such as a transparent network Amazon Web Services® Partner Network (APN) Customer Engagements (ACE) API, for providing and/or receiving communications to/from one or more provider systems. As another example, the platform message interface may include a cross-platform interface, through a transparent network Provider Connected Gateway (PCG), for providing and/or receiving communications to/from one or more other platform systems. In some examples, the PCG may be based on a Fast Healthcare Interoperability Resources (FHIR) API. In accordance with some embodiments of the present disclosure, this unique combination of entity-entity interfaces may be leveraged by one or more services of the platform message interface to improve network communications within a network domain by intelligently filtering and routing messages between traditionally disconnected entities.

In some embodiments, the term "orchestration service" refers to message processing service of a platform system. In some examples, the orchestration service may include a component of a platform message interface. An orchestration service may be a service executable on a platform system to perform one or more operations of the present disclosure for intelligently filtering and/or routing communications between various entities within a network domain. In some examples, the orchestration service may be instantiated at each of a plurality of different platform systems within a network domain to enable traditionally unachievable platform-platform message routing actions. By way of example, an orchestration service may be instantiated by executing one or more computer readable instructions using one or more processors of a respective platform system. In this respect, the orchestration service may correspond with a plug-in, standalone application, and/or any other form of computer readable media that is executable by one or more platform systems within a network domain.

In some embodiments, the orchestration service processes one or more communications received through the one or more transparent network APIs of the platform message interface. For instance, the orchestration service may identify one or more provider-platform request messages, received through the provider-platform interface, that may be associated with a designation error. The orchestration service may identify a primary coverage platform based on the designation error and auto-route, through the cross-platform interface, a platform-platform request message to an identified primary coverage platform. In some examples, an orchestration service may generate and store a record of the routing action. In addition, or alternatively, the orchestration service may issue, through the provider-platform interface, an alert message to a respective provider system that is reflective of the rerouting action for the provider-platform request message. The orchestration service may receive, through the cross-platform interface, a platform-platform response message from the primary coverage platform and provide, through the provider-platform interface, a platform-provider response message to the provider system. In this manner, the orchestration service may leverage the multifaceted interfaces of the platform message interface to reinvent the relationship between entities (e.g., provider systems, platform systems, etc.) within a network domain by facilitating a private-exchange among three involved parties (Provider-Primary Platform-Secondary Platform) instead of the traditional and inefficient two-way (Provider-Platform) message exchanges.

In some embodiments, the term "provider-platform request message" refers to a data entity that describes a communication from a provider system and a platform system. A provider-platform request message may include one or more API based messages that may be received by a platform system through a provider-platform interface. In some examples, a provider-platform request message may include a provider service request that may describe a request for a performance of an action by a platform system. A provider-platform request message may depend on a network domain. As one example, with reference to a COB-based network domain, a provider service request may include a medical claim requesting a payment of at least a portion of a medical activity performed by a health care provider. By way of example, the provider service request may be provided, through a provider-platform request message, by a provider system on behalf of a member of the platform system. The provider service request may identify a designated coverage platform for the member, an entity identifier, one or more member attributes associated with the member, one or more service attributes associated with the healthcare service, and/or the like.

In some embodiments, the term "designated coverage platform" refers to platform system that is identified by a provider-platform request message. A designated coverage platform, for example, may include a reference within a medical claim to identifies a platform entity as a primary payer for the medical claim.

In some embodiments, the term "entity identifier" refers to a unique data element that identifies a member entity. An entity identifier, for example, may include an alpha-numeric reference, such as a subscriber number, member number, and/or the like that corresponds to a member entity. An entity identifier may include a platform-specific identifier that is assigned and/or interpretable by a specific platform system. In addition, or alternatively, an entity identifier may include a platform-agnostic identifier that is interpretable by a plurality of platform systems within a network domain.

In some embodiments, the term "entity coverage dataset" refers to a data structure that describes coverage data associated with a plurality of entities within a network domain. An entity coverage dataset may include any type of data storage structure including, as examples, one or more linked lists, databases, and/or the like. In some examples, an entity coverage dataset may include one or more relational tables, knowledge graphs, and/or the like that identify one or more coverage rules, hierarchies, and/or the like for a plurality of member entities within a network domain. As an example, in a COB-based network domain, an entity coverage dataset may reflect a primary, secondary, tertiary, and/or the like coverage platform for a patient with respect to one or more covered healthcare services. By way of example, a primary coverage platform for a particular healthcare service may be a platform entity that is primarily responsible for facilitating (e.g., paying for, etc.) the particular healthcare service. As another example, a secondary coverage platform for the particular healthcare service may be secondarily responsible for facilitating (e.g., paying for, etc.) the particular healthcare service and therefore may only facilitate a portion of the particular healthcare service that is not covered by the primary coverage platform. A patient may be associated with any number platform entities, each primary, secondary, tertiary or the like with respect to different types of healthcare service. This, in turn, creates a complex web of connections that may be recorded by the entity coverage dataset.

In some embodiments, an entity coverage dataset is continuously updated as coverage information for a plurality of member entities within a network domain is uncovered. Such information, for example, may be recorded through member interactions (e.g., communications from members that update their coverages, etc.), member investigations (e.g., manual and/or automated COB investigations, etc.), historical coverage interactions (e.g., historical claim denials, acceptances, etc. by one or more platform entities), and/or the like. In this way, an entity coverage dataset may provide up-to-date member-platform relationship information that may be leveraged to identify a platform entity's relationship with respect to a provider service request for a particular member.

In some embodiments, the term "primary coverage platform" refers to a platform entity that is primarily responsible for facilitating a provider service request. In some examples, a primary coverage platform may be configured to facilitate at least a portion of a provider service request. By way of example, in a COB-based network domain, a primary coverage platform and the portion of the provider service request covered by the primary coverage platform may be defined by a member's healthcare plan with a respective insurance platform.

In some embodiments, the term "designation error" refers to a discrepancy between a designated coverage platform and a primary coverage platform. For instance, a designation error may reflect an error within a provider service request that identifies a platform entity that is not primarily responsible for the provider service request. In some examples, a designation error may be based on a comparison between (a) a primary coverage platform identified, using one or more attributes (e.g., entity identifier, etc.), from the entity coverage dataset and (b) a designated coverage platform identified by the provider service request.

By way of example, in a COB-based network domain, a designation error may be identified by a platform system in response to recognizing one or more medical claims received from a provider system for one or more member entities that are identified as having primary coverage with another platform system. In some examples, an orchestration service (and/or a filter service of the platform message interface) may identify a primary coverage platform for one or more provider service requests as they are received through the provider-platform interface. For instance, a provider service request may trigger a determination of a primary coverage platform and, in some instances, a determination of a designation error.

In some embodiments, the term "platform-platform request message" refers to a data entity that describes a cross-platform communication from a platform system to another platform system. A platform-platform request message may include one or more API based messages that may be provided from a platform system through a cross-platform interface to another platform system. In some examples, a provider-platform request message may include an auto-routed message between two platforms in response to a designation error. For instance, a platform-platform request message may be provided from a designated coverage platform, through a cross-platform interface, to a primary coverage platform for a provider service request. In this manner, by leveraging the cross-platform interface, a platform-platform request message may replace traditional messages in which a provider service request is returned to a provider system without notifying a primary coverage platform. This, in turn, allows a designated provider platform to act on behalf of a provider system to correctly route a provider service request.

For example, in the event that a primary coverage platform is identified that is different than a designated coverage platform of a provider service request, the designated coverage platform may auto-route, through a platform-platform request message via a cross-platform interface, information associated with the provider service request to the primary coverage platform. In some examples, with reference to a COB-based network domain, the platform-platform request message may include billing information, insurance subscriber details (e.g., entity identifier), and/or the like that is associated with a medical claim. In some examples, the platform-platform request message may be generated in accordance with a standardized request message format that is recognizable by the primary coverage platform.

In some embodiments, the term "standardized request message format" refers to a message format for a cross-platform communication, such as platform-platform request message. A standardized request message format may include any messaging format that is recognizable (e.g., readable, etc.) by one or more platform systems within a network domain. By way of example, with reference to a COB-based network domain, a standardized request message format may include an electronic data interchange (EDI) 837 file, and/or the like that may reproduce medical claim information identified by a provider service request.

In some embodiments, the term "alert message" refers to a data entity that describes a platform-provider communication from a platform system to a provider system. An alert message may include one or more API based messages that may be provided from a platform system through a provider-platform interface to provider system. In some examples, an alert message may include a request status response message identifying a status of a provider service request. For instance, an alert message may be provided from a designated coverage platform, through a provider-platform interface, to the provider system to notify the provider system that the provider service request has been forwarded to another platform entity. In this manner, by leveraging multifaceted interfaces, an alert message may be provided to a provider system instead of returning a provider-platform request message.

In some examples, with reference to a COB-based network domain, the alert message may include claim status response transaction provided, via the provider-platform interface, to a provider system that notifies the provider system that a medical claim has been forwarded to another platform entity. In some examples, the alert message may be generated in accordance with a standardized alert message format that is recognizable by the provider system.

In some embodiments, the term "standardized alert message format" refers to a message format for an alert message. A standardized alert message format may include any messaging format that is recognizable (e.g., readable, etc.) by one or more provider systems within a network domain. By way of example, with reference to a COB-based network domain, a standardized alert message format may include a claim status response (277) transaction traditionally used to respond to request inquiries from a provider system with respect to a status of a previously submitted claim.

In some embodiments, the term "platform-platform response message" refers to a data entity that describes a cross-platform response communication from a platform system to another platform system. A platform-platform response message may include one or more API based messages that may be provided from a platform system through a cross-platform interface to another platform system. In some examples, a platform-platform response message may include a response message to a platform-platform request message. For instance, the platform-platform response message may be provided by a primary coverage platform through a cross-platform interface to a designated coverage platform for a provider service request.

In some examples, with reference to a COB-based network domain, the platform-platform response message may include an explanation of benefits (EOB) provided directly from the primary coverage platform to the designated coverage platform (or another platform entity that is a secondary coverage platform). In some examples, the platform-platform response message may include claim balance information, such as a primary coverage portion, a secondary coverage portion, and/or the like with respect to a medical claim. By way of example, upon the primary coverage platform successfully processing a medical claim, a secondary coverage platform, such as a designated coverage platform that originally received the claim, may process the claim, as returned through the platform-platform response message as secondary and issue the claim balance as secondary payer. In some examples, the platform-platform response message may be generated in accordance with a standardized response message format that is recognizable by the designated coverage platform (or another platform entity that is a secondary coverage provider).

In some embodiments, the term "primary coverage portion" refers to a portion of a provider service request that is facilitated by a primary coverage platform. By way of example, with reference to a COB-based network domain, a primary coverage portion may include a portion of a medical claim paid by a primary insurance provider.

In some embodiments, the term "secondary coverage portion" refers to a portion of a provider service request that is facilitated by a secondary coverage platform. By way of example, with reference to a COB-based network domain, a secondary coverage portion may include a portion of a medical claim paid by a secondary insurance provider after a primary insurance provider.

In some embodiments, the term "platform-provider response message" refers to a data entity that describes a platform-provider communication from a platform system to a provider system. A platform-provider response message may include one or more API based messages that may be provided from a platform system through a provider-platform interface to a provider system. In some examples, a platform-provider response message may include a response to a service provider request that identified a primary coverage portion, a secondary coverage portion, and/or a remaining portion of the provider service request. In some examples, with reference to a COB-based network domain, the platform-provider response message may include electronic remittance advice (ERA), such an 835 message, that provides claim payment information and documents an electronic funds transfer from one or more insures to a healthcare provider in response to an 837 request. In some examples, the platform-provider response message may be generated in accordance with a standardized response message format that is recognizable by the provider system.

In some embodiments, the term "standardized response message format" refers to a message format for a platform-provider communication, such as platform-provider response message. A standardized response message format may include any messaging format that is recognizable (e.g., readable, etc.) by one or more provider systems within a network domain. By way of example, with reference to a COB-based network domain, a standardized request message format may include an electronic data interchange (EDI) 835 file, and/or the like that may confirm payment of a primary and/or secondary claim balance.

IV. OVERVIEW AND TECHNICAL IMPROVEMENTS

Various embodiments of the present disclosure provide message filtering and routing techniques that improve traditional communication techniques within a complex network domain. To do so, embodiments of the present disclosure provide a cross-platform collaboration messaging process to alleviate technical challenges that traditionally inhibit the resolution of messages submitted to various disparate platforms within the complex network domain. For example, a network domain may involve multiple platforms that may be affiliated with a message through complex hierarchical relationships. As one example, a message may include a medical claim that may be covered by one or more of a plurality of insurance platforms in a hierarchical manner. For instance, a first insurance platform may be a primary payer of the claim and therefore primarily responsible for paying the claim, whereas a second insurance platform may be a secondary payer of the claim and only responsible for a portion of the claim that is not covered by the primary payer. In such scenarios, a message must be processed in a particular order (e.g., primary payer then secondary payer, etc.) according to the hierarchical relationship associated with the message. Traditionally, these complex relationships are handled through coordinated messages between a provider and each individual platform that, if coordinated incorrectly, may result in redundant messages increasing the time, cost, and number of touchpoints required to ultimately resolve the message. To alleviate these technical challenges, some embodiments of the present disclosure provide a cross-platform collaboration messaging process that enables a platform to reroute messages of behalf of a provider. In this manner, redundant messages are eliminated, thereby reducing the time, cost, and number of touchpoints required for ultimately resolving the message.

In some embodiments, some of the message filtering and routing techniques of the present disclosure involve a three-party private exchange enabled by multifaceted interfaces accessible by one or more platforms within a network domain. For instance, some embodiments of the present disclosure may effectively reinvent the relationship between a providing entity, such as a health care provider that submits a medical claim, and a receiving entity, such as a health insurance platform, by opening a private exchange among three involved parties. The private exchange may be enabled by multiple interfaces including a provider-platform interface that facilitates communication between a provider and a platform entity and a cross-platform interface that facilitates communication between two or more platform entities. By doing so, the traditional and inefficient two-way provider-platform messaging scheme may be improved to allow collaboration between multiple platforms potentially affiliated with a message.

In some embodiments, some of the message filtering and routing techniques of the present disclosure enable automatic message filtering and rerouting techniques within a complex network domain. For instance, using some of the techniques of the present disclosure, a message may be identified and rerouted according to criteria establishing a hierarchical relationship between different entities within a network domain and a message. For instance, a message may erroneously identify a designated platform as the platform primarily responsible for processing the message. Using the techniques of the present disclosure, the designated platform may identify a designation error associated with the message and, in response to the designation error, automatically reroute the message to the correct platform. This may be done without returning the message to the provider. In this way, a designated platform, regardless of the correctness of the designation, may act on behalf of a provider to facilitate the resolution of a message in an efficient manner that reduces redundant messages and the time to resolution.

In some embodiments, some of the message filtering and routing techniques of the present disclosure enable platform to platform collaboration techniques for jointly handling hierarchical relationships within a complex domain. For example, some of the techniques of the present disclosure may enable the identification of hierarchical relationships with respect to a message. Using the cross-platform interfaces of the present disclosure, the message may be intelligently routed between platforms in accordance with the identified hierarchical relationships to iteratively resolve a message through platform-to-platform collaboration. In this manner, platforms that are better situated for efficiently resolving a message may collaborate on behalf of a provider to facilitate the resolution of the message. This, in turn, reduces redundant messaging within a complex network domain that may result in wasted computing resources, among other technical deficiencies described herein.

Examples of technologically advantageous embodiments of the present disclosure include: (i) a three-party private exchange enabled by multifaceted interfaces, (ii) automatic message filtering and rerouting techniques within a complex network domain, (iii) platform to platform collaboration techniques for jointly handling hierarchical relationships within a complex domain, among other aspects of the present disclosure. Other technical improvements and advantages may be realized by one of ordinary skill in the art.

V. EXAMPLE SYSTEM OPERATIONS

As indicated, various embodiments of the present disclosure make important technical contributions to communication techniques in complex network domains. In particular, systems and methods are disclosed herein that implement message filtering and routing techniques to improve communications within a network domain. By doing so, messages may be efficiently passed between entities within the network domain, which may result in technical improvements to traditional network infrastructures.

Figure 3:
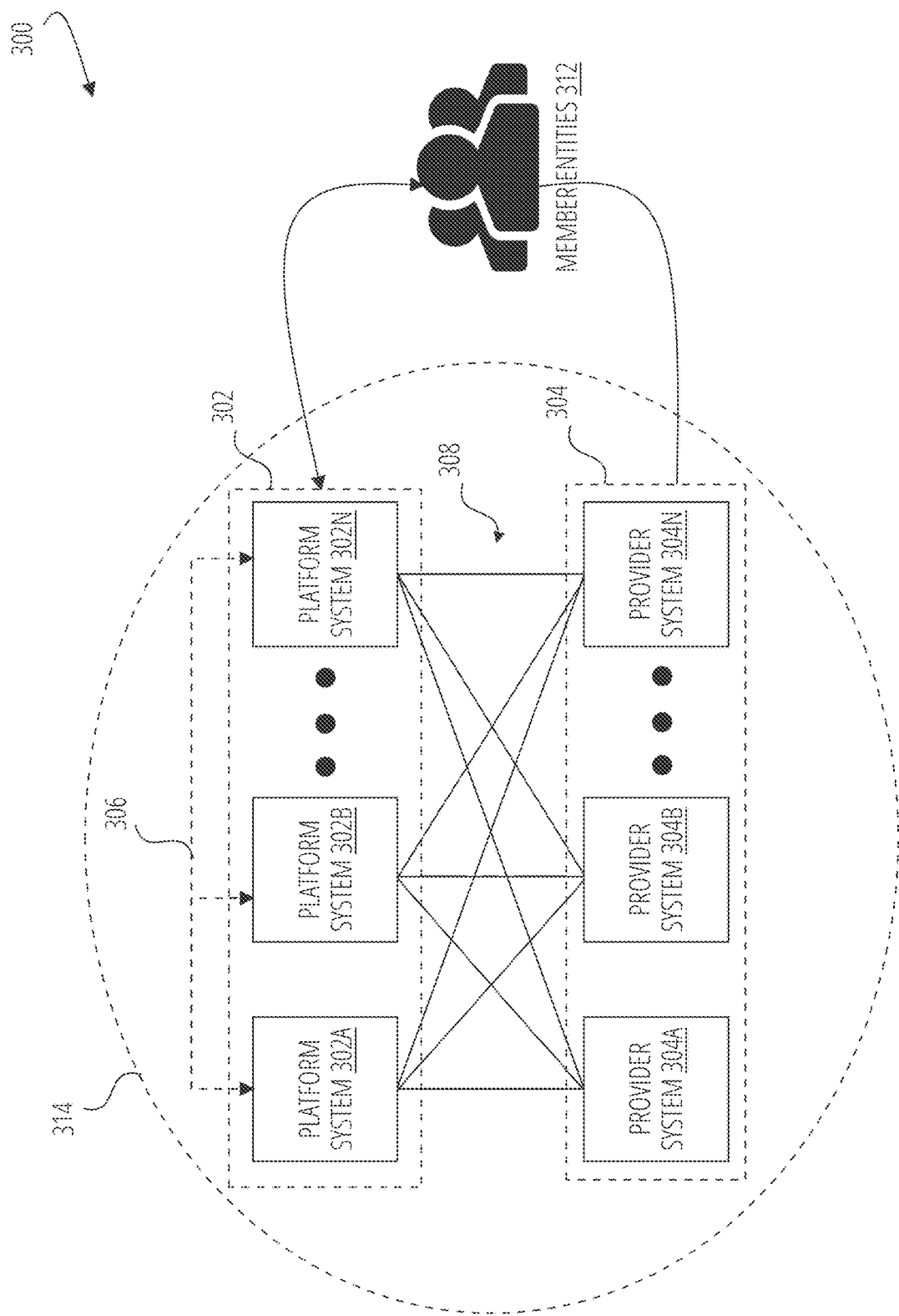
FIG. 3 is a system diagram showing an example network domain in accordance with some embodiments discussed herein.

FIG. 3 is a system diagram 300 showing an example network domain in accordance with some embodiments discussed herein. The system diagram 300 includes a plurality of computing entities that may interact on behalf of one or more member entities 312 to facilitate a service. The plurality of entities may communicate through one or more network interfaces to exchange messages for facilitating the service. Traditionally, network domains may be limited due to a lack of network interfaces between disparate computing entities. Using some of the techniques of the present disclosure, multifaceted interfaces, such as the cross-platform interfaces 306, provider-platform interface 308, etc., may be leveraged to open communication channels between traditionally isolated entities within the network domain 314.

In some embodiments, the network domain 314 is a network of entities that may communicate, using some of the techniques of the present disclosure, to facilitate one or more real world services. A network domain 314 may communicatively connect a plurality of different entities through one or more networking channels, interfaces, messaging schema, and/or the like. Each of the different entities may be associated with a particular aspect of a real-world service. For instance, the different entities may include a plurality of recipient entities that receive a service, a plurality of provider entities that provide a service, and/or a plurality of platform entities that facilitate the service on behalf of the recipient entities. Each of the entities may communicate, via respective computing systems and using one or more wired and/or wireless networks to facilitate the service. In some examples, the plurality of entities may be related through one or more complex relationships that, as described herein, are inefficiently handled by traditional communication mechanisms within the network domain 314.

An example of the network domain 314 may include a COB healthcare domain in which a patient (e.g., recipient entity) receives a healthcare service from a healthcare provider (e.g., provider entity) that is compensated for by one or more insurance platforms (e.g., platform entities) based on the patient's membership with the one or more insurance platforms. The potential for multiple hierarchical platform relationships with a patient adds layers of complexity, time, and cost to the provider-payer relationship. A COB transaction is an industry standard practice used to share the cost of care between two or more platforms when a member is covered by more than one health benefit plan. In such a case, different governing guidelines (e.g., NAIC guidelines, CMS, etc.) are individually used by each platform to determine which platform is primary for a medical claim from a healthcare provider. In the event that a platform is not the primary paying platform for a medical claim, the medical claim is denied and sent back to the healthcare provider. The healthcare provider then provides the same claim to the primary paying platform. This multi-step process causes delays in the processing of services and increased costs for all entities involved in the network domain 314. Some embodiments of the present disclosure may address these deficiencies using new entity-entity interfaces and automatic rerouting mechanisms that improve the transfer of data across entities within the network domain 314, such as the COB healthcare domain.

In some embodiments, a network domain 314 includes a plurality of platform systems 302 and a plurality of provider systems 304 that are associated with a plurality of member entities 312. The plurality of provider systems 304 may include a plurality of disparate computing systems respectively associated with a plurality of provider entities within the network domain 314 (e.g., healthcare providers in COB healthcare domain). For example, the provider systems 304 may include a first provider system 304A associated with a first provider entity, a second provider system 304B associated with a second provider entity, a third provider system 304N associated with a third provider entity, and/or the like.

In some embodiments, each provider system 304 is a computing system associated with a respective provider entity. A provider system 304, for example, may include an example computing entity, including one or processors and/or memory storing instructions that, when executed by the one or more processors, cause the computing entity to perform one or more operations described herein. In some examples, a provider system 304 may include a user device, such as a mobile phone, desktop computer, laptop, and/or the like. In addition, or alternatively, a provider system 304 may include at least a portion of a cloud server, such as a user account, and/or the like that is associated with a provider entity. By way of example, in a COB network domain, a provider system 304 may include a computing entity that is accessible by a healthcare provider for creating, submitting, and/or revising medical claims.

In some embodiments, the provider systems 304 are communicatively connected, through one or more provider-platform interfaces 308 with one or more of a plurality of platform systems 302. In this manner, the provider system 304 may communicate messages in a two-way messaging exchange with a particular platform system 302. This may allow the provider systems 304 to provide a message to and receive a response from a single platform system 302 at a time, which is inefficient for complex network domains, such as the network domain 314 with a plurality of platform systems 302. For example, the plurality of platform systems 302 may include a plurality of disparate computing systems respectively associated with a plurality of platform entities within the network domain 314 (e.g., insurance platforms in COB healthcare domain). For instance, the platform systems 302 may include a first platform system 302A associated with a first platform entity, a second platform system 302B associated with a second platform entity, a third platform system 302N associated with a third platform entity, and/or the like.

In some embodiments, each platform system 302 is a computing system associated with a platform entity. A platform system 302, for example, may include an example computing entity, including one or processors and/or memory storing instructions that, when executed by the one or more processors, cause the computing entity to perform one or more operations described herein. In some examples, a platform system 302 may include a user device, such as a mobile phone, desktop computer, laptop, and/or the like. In addition, or alternatively, a platform system 302 may include at least a portion of a cloud server, such as a user account, and/or the like that is associated with a platform entity. By way of example, in a COB network domain, a platform system may include a computing entity that is accessible by an insurance platform for receiving, processing, and/or rerouting medical claims.

Traditionally, each of the platform systems 302 are isolated from one another. Using new interfaces, such as the cross-platform interface 306, some techniques of the present disclosure may enable more efficient communication schemes within the network domain 314. For example, in accordance with some embodiments of the present disclosure, the plurality of platform systems 302 and the plurality of provider systems 304 are communicatively connected through one or more interfaces, including the cross-platform interface 306 and/or the provider-platform interface 308. Using the interfaces of the present disclosure, messages between entities may be intelligently filtered and routed across different entities within the network domain 314 to overcome inefficiencies plagued by traditional network infrastructures. Examples of such message filtering and routing techniques will now further be described with reference to FIG. 4.

Figure 4:
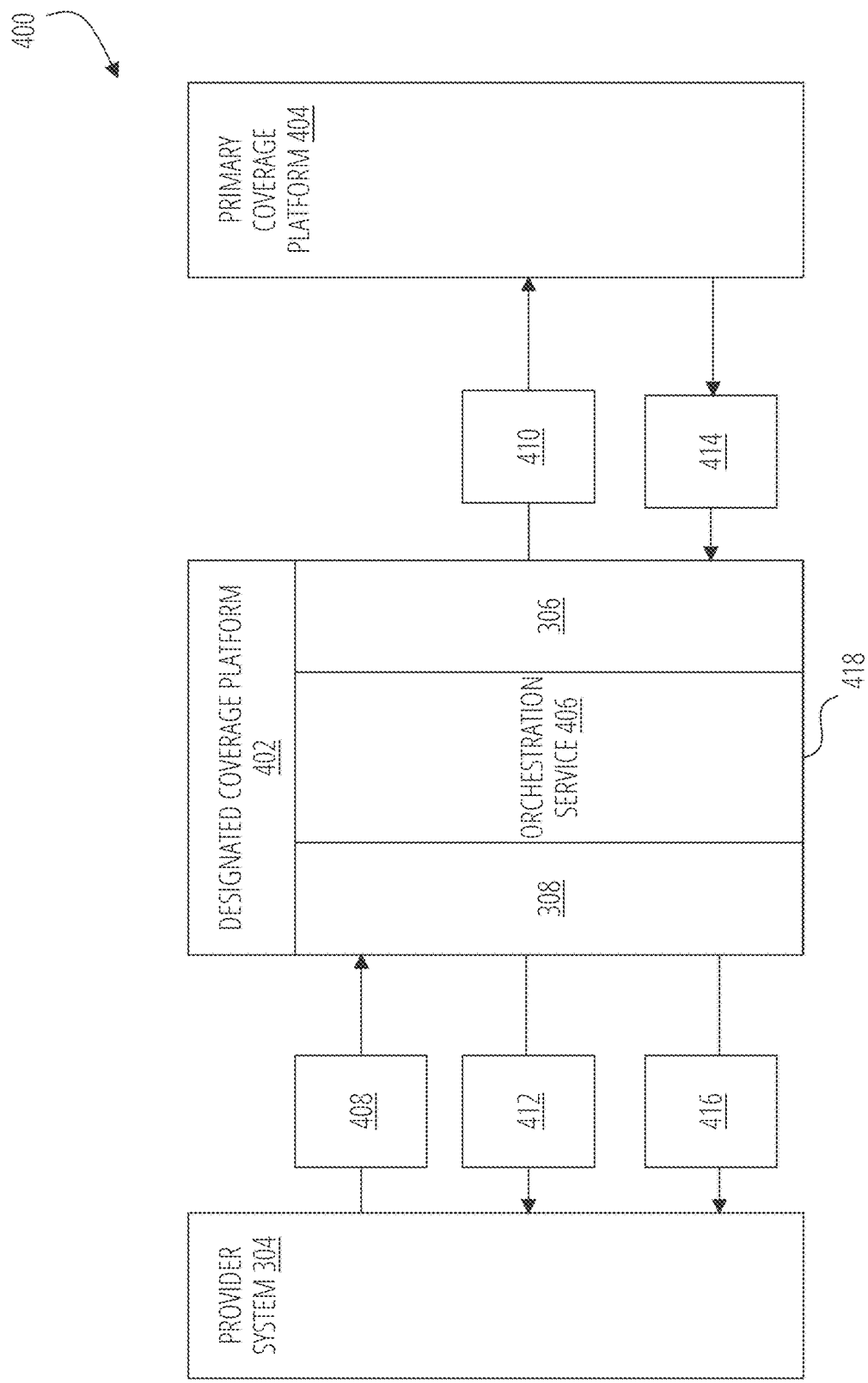
FIG. 4 is a dataflow diagram showing example data structures and modules for intelligently routing a message between entities within a network domain in accordance with some embodiments discussed herein.

FIG. 4 is a dataflow diagram 400 showing example data structures and modules for intelligently routing a message between entities within a network domain in accordance with some embodiments discussed herein. The dataflow diagram 400, for example, illustrates an intelligent message filtering and routing process for facilitating a service on behalf of an entity. The intelligent message filtering and routing process may be facilitated by exchanging, through one or more network interfaces, a sequence of messages between a plurality of entities in a three-party private exchange. The message filtering and routing process, for example, may be facilitated by a platform system and/or an intermediary message filtering computing system responsive to provider-platform request messages 408 issued by a provider system 304. The platform system, for example, may include a designated coverage platform 402 that is identified by the provider-platform request message 408. The designated coverage platform 402 (and/or one or more other platform systems within the network domain) may include a platform message interface 418 for receiving and processing the provider-platform request message 408.

In some embodiments, a provider-platform request message 408 is received that identifies a provider service request and a designated coverage platform 402 as corresponding to the provider service request. In some examples, the provider-platform request message 408 may originate from the provider system 304. By way of example, the provider service request may be a medical claim submitted to the designated coverage platform 402 by the provider system 304.

In some embodiments, the provider-platform request message 408 is received by the designated coverage platform 402. In addition, or alternatively, the provider-platform request message 408 may be received by an intermediary message filtering computing system. In some examples, the provider-platform request message 408 is received through a provider-platform interface 308 of the designated coverage platform 402. In some examples, the provider-platform interface 308 may be a component of a platform message interface 418.

In some embodiments, a platform message interface 418 is a frontend interface of a platform system. The platform message interface 418 may include one or more application programing interface (API) gateways configured to receive and/or provide messages from/to one or more external entities with a network domain, such as the provider system 304, another platform system, and/or the like. In some examples, the platform message interface 418 may include one or more transparent network APIs for communicating with one or more different entities within the network domain. In some examples, the platform message interface 418 may include a first transparent network API, such as a provider-platform interface 308, for communicating with one or more provider systems 304 and/or a second transparent network API, such as a cross-platform interface 306, for communicating with one or more other platform systems.

For example, the platform message interface 418 may include a provider-platform interface 308, such as an ACE API, for providing and/or receiving communications to/from one or more provider systems 304. As another example, the platform message interface 418 may include a cross-platform interface 306, such as a transparent network PCG, for providing and/or receiving communications to/from one or more other platform systems. In some examples, the PCG may be based on a FHIR API. In accordance with some embodiments of the present disclosure, this unique combination of entity-entity interfaces may be leveraged by one or more services of the platform message interface 418 to improve network communications within a network domain by intelligently filtering and routing messages between traditionally disconnected entities.

In some embodiments, the orchestration service 406 is a message processing service of a platform system. In some examples, the orchestration service 406 may include a component of a platform message interface 418. The orchestration service 406 may be a service executable on a platform system to perform one or more operations of the present disclosure for intelligently filtering and/or routing communications between various entities within a network domain. In some examples, the orchestration service 406 may be instantiated at each of a plurality of different platform systems within a network domain to enable traditionally unachievable platform-platform message routing actions. By way of example, the orchestration service 406 may be instantiated by executing one or more computer readable instructions using one or more processors of a respective platform system. In this respect, the orchestration service 406 may correspond with a plug-in, standalone application, and/or any other form of computer readable media that is executable by one or more platform systems within a network domain.

In some embodiments, the orchestration service 406 processes one or more communications received through the one or more transparent network APIs of the platform message interface 418. For instance, the orchestration service 406 may identify one or more provider-platform request messages 408, received through the provider-platform interface 308, that may be associated with a designation error. The orchestration service 406 may identify a primary coverage platform 404 based on the designation error and auto-route, through the cross-platform interface 306, a platform-platform request message 410 to the identified primary coverage platform 404. In some examples, the orchestration service 406 may generate and store a record of the routing action. In addition, or alternatively, the orchestration service 406 may issue, through the provider-platform interface 308, an alert message 412 to a respective provider system 304 that is reflective of the rerouting action for the provider-platform request message 408. The orchestration service 406 may receive, through the cross-platform interface 306, a platform-platform response message 414 from the primary coverage platform 404 and provide, through the provider-platform interface 308, a platform-provider response message 416 to the provider system 304. In this manner, the orchestration service 406 may leverage the multifaceted interfaces of the platform message interface 418 to reinvent the relationship between entities (e.g., provider systems, platform systems, etc.) within a network domain by facilitating a private-exchange among three involved parties (Provider-Primary Platform-Secondary Platform) instead of the traditional and inefficient two-way (Provider-Platform) message exchanges.

In some embodiments, a provider-platform request message 408 is a data entity that describes a communication from a provider system 304 and a platform system. A provider-platform request message 408 may include one or more API based messages that may be received by a platform system through a provider-platform interface 308. In some examples, the provider-platform request message 408 may include a provider service request that may describe a request for a performance of an action by a platform system. A provider-platform request message 408 may depend on a network domain. As one example, with reference to a COB-based network domain, a provider service request may include a medical claim requesting a payment of at least a portion of a medical activity performed by a health care provider. By way of example, the provider service request may be provided, through a provider-platform request message 408, by a provider system 304 on behalf of a member of the platform system. The provider service request may identify a designated coverage platform 402 for the member, an entity identifier, one or more member attributes associated with the member, one or more service attributes associated with the healthcare service, and/or the like.

In some embodiments, the designated coverage platform 402 is a platform system that is identified by a provider-platform request message 408. The designated coverage platform 402, for example, may include a reference within a medical claim to identifies a platform entity as a primary payer for the medical claim.

In some embodiments, a primary coverage platform 404 is identified that corresponds to the provider service request of the provider-platform request message 408. In some examples, the primary coverage platform 404 may identify the primary coverage platform 404. In addition, or alternatively, an intermediary message filtering computing system may identify the primary coverage platform 404. In some examples, the designated coverage platform 402 (e.g., platform message interface 418, orchestration service 406, etc.) may identify an entity identifier from the provider-platform request message 408. The designated coverage platform 402 may access an entity coverage dataset associated with the designated coverage platform 402 and identify, using the entity coverage dataset, the primary coverage platform 404 based on the entity identifier and the provider service request.

In some embodiments, the primary coverage platform 404 is a platform entity that is primarily responsible for facilitating a provider service request. In some examples, a primary coverage platform 404 may be configured to facilitate at least a portion of a provider service request. By way of example, in a COB-based network domain, a primary coverage platform 404 and the portion of the provider service request covered by the primary coverage platform 404 may be defined by a member's healthcare plan with a respective insurance platform.

In some embodiments, a designation error associated with the indication of the designated coverage platform 402 by the provider-platform request message 408 is identified. For instance, the designated coverage platform 402 (e.g., platform message interface 418, orchestration service 406, etc.) may identify the designation error. In addition, or alternatively, an intermediary message filtering computing system may identify the designation error. The designation error, for example, may be based on a comparison between the primary coverage platform 404 and the designated coverage platform 402.

In some embodiments, a designation error is a discrepancy between a designated coverage platform 402 and a primary coverage platform 404. For instance, a designation error may reflect an error within a provider service request that identifies a platform entity that is not primarily responsible for the provider service request. In some examples, a designation error may be based on a comparison between (a) a primary coverage platform 404 identified, using one or more attributes (e.g., entity identifier, etc.), from the entity coverage dataset and (b) a designated coverage platform 402 identified by the provider service request.

By way of example, in a COB-based network domain, a designation error may be identified by a platform system in response to recognizing one or more medical claims received from a provider system for one or more member entities that are identified as having primary coverage with another platform system. In some examples, the orchestration service 406 (and/or a filter service of the platform message interface 418) may identify a primary coverage platform 404 for one or more provider service requests as they are received through the provider-platform interface 308. For instance, a provider service request may trigger a determination of a primary coverage platform 404 and, in some instances, a determination of a designation error.

In some embodiments, in response to an identification of a designation error associated with the designated coverage platform 402, the provider-platform request message 408 is rerouted to a primary coverage platform 404. For example, the designated coverage platform 402 (and/or an intermediary message filtering computing system, etc.) may provide, to the primary coverage platform 404, using the cross-platform interface 306, a platform-platform request message 410 that identifies the provider service request. In some examples, the provider-platform request message 408 may be generated in accordance with a standardized request message format.

In some embodiments, the provider-platform request message 408 is a data entity that describes a cross-platform communication from a platform system to another platform system. A platform-platform request message 410 may include one or more API based messages that may be provided from a platform system through a cross-platform interface 306 to another platform system. In some examples, a provider-platform request message 408 may include an auto-routed message between two platforms in response to a designation error. For instance, a platform-platform request message 410 may be provided from a designated coverage platform 402, through a cross-platform interface 306, to a primary coverage platform 404 for a provider service request. In this manner, by leveraging the cross-platform interface 306, a platform-platform request message 410 may replace traditional messages in which a provider service request is returned to a provider system 304 without notifying a primary coverage platform 404. This, in turn, allows a designated coverage platform 402 to act on behalf of a provider system 304 to correctly route a provider service request.

For example, in the event that a primary coverage platform 404 is identified that is different than a designated coverage platform 402 of a provider service request, the designated coverage platform 402 may auto-route, through a platform-platform request message 410 via a cross-platform interface 306, information associated with the provider service request to the primary coverage platform 404. In some examples, with reference to a COB-based network domain, the platform-platform request message 410 may include billing information, insurance subscriber details (e.g., entity identifier), and/or the like that is associated with a medical claim. In some examples, the platform-platform request message 410 may be generated in accordance with a standardized request message format that is recognizable by the primary coverage platform 404.

In some embodiments, the standardized request message format is a message format for a cross-platform communication, such as platform-platform request message 410. A standardized request message format may include any messaging format that is recognizable (e.g., readable, etc.) by one or more platform systems within a network domain. By way of example, with reference to a COB-based network domain, a standardized request message format may include an electronic data interchange (EDI) 837 file, and/or the like that may reproduce medical claim information identified by a provider service request.

In some embodiments, the provider system 304 is alerted in response to the identification of the designation error. For example, the designated coverage platform 402 (and/or an intermediary message filtering computing system, etc.) may provide an alert message 412 to the provider system 304. In some examples, the alert message 412 may be generated in accordance with a standardized alert message format. In some examples, the alert message 412 may include a message status response. In some examples, the designated coverage platform 402 may provide the alert message 412 without returning the provider-platform request message 408. In this way, a provider system 304 may notified of a rerouted message without having to reroute the message itself.

In some embodiments, the alert message 412 is a data entity that describes a platform-provider communication from a platform system to the provider system 304. An alert message 412 may include one or more API based messages that may be provided from a platform system through a provider-platform interface 308 to the provider system 304. In some examples, the alert message 412 may include a request status response message identifying a status of a provider service request. For instance, the alert message 412 may be provided from a designated coverage platform 402, through a provider-platform interface 308, to the provider system 304 to notify the provider system 304 that the provider service request has been forwarded to another platform entity. In this manner, by leveraging multifaceted interfaces, the alert message 412 may be provided to a provider system 304 instead of returning the provider-platform request message 408.

In some examples, with reference to a COB-based network domain, the alert message 412 may include claim status response transaction provided, via the provider-platform interface 308, to a provider system 304 that notifies the provider system 304 that a medical claim has been forwarded to another platform entity. In some examples, the alert message 412 may be generated in accordance with a standardized alert message format that is recognizable by the provider system 304.

In some embodiments, the standardized alert message format is a message format for an alert message 412. The standardized alert message format may include any messaging format that is recognizable (e.g., readable, etc.) by one or more provider systems 304 within a network domain. By way of example, with reference to a COB-based network domain, a standardized alert message format may include a claim status response (277) transaction traditionally used to respond to request inquiries from a provider system 304 with respect to a status of a previously submitted claim.

In some embodiments, a platform-platform response message 414 is received. For instance, the designated coverage platform 402 (and/or an intermediary message filtering computing system, etc.) may receive, via the cross-platform interface 306, a platform-platform response message 414 that identifies a primary coverage portion of the provider service request.

In some embodiments, the platform-platform response message 414 is a data entity that describes a cross-platform response communication from a platform system to another platform system. A platform-platform response message 414 may include one or more API based messages that may be provided from a platform system through a cross-platform interface 306 to another platform system. In some examples, a platform-platform response message 414 may include a response message to a platform-platform request message 410. For instance, the platform-platform response message 414 may be provided by a primary coverage platform 404 through a cross-platform interface 306 to a designated coverage platform 402 for a provider service request.

In some examples, with reference to a COB-based network domain, the platform-platform response message 414 may include an explanation of benefits (EOB) provided directly from the primary coverage platform 404 to the designated coverage platform 402 (or another platform entity that is a secondary coverage platform). In some examples, the platform-platform response message 414 may include claim balance information, such as a primary coverage portion, a secondary coverage portion, and/or the like with respect to a medical claim. By way of example, upon the primary coverage platform 404 successfully processing a medical claim, a secondary coverage platform, such as a designated coverage platform 402 that originally received the claim, may process the claim, as returned through the platform-platform response message 414 as secondary and issue the claim balance as secondary payer. In some examples, the platform-platform response message 414 may be generated in accordance with a standardized response message format that is recognizable by the designated coverage platform 402 (or another platform entity that is a secondary coverage provider).

In some embodiments, the primary coverage portion is a portion of a provider service request that is facilitated by a primary coverage platform 404. By way of example, with reference to a COB-based network domain, the primary coverage portion 510 may include a portion of a medical claim paid by a primary insurance provider.

In some embodiments, a secondary coverage portion is determined for the provider service request. For instance, the designated coverage platform 402 (and/or an intermediary message filtering computing system, etc.) may determine a secondary coverage portion for the provider service request.

In some embodiments, the secondary coverage portion is a portion of a provider service request that is facilitated by a secondary coverage platform. By way of example, with reference to a COB-based network domain, a secondary coverage portion may include a portion of a medical claim paid by a secondary insurance provider after a primary insurance provider.

In some embodiments, a platform-provider response message 416 is generated based on the first coverage portion and the second coverage portion. For instance, the designated coverage platform 402 (and/or an intermediary message filtering computing system, etc.) may generate the platform-provider response message 416. In some examples, the platform-provider response message 416 identifies the primary coverage portion, the secondary coverage portion, and a remainder portion of the provider service request. In some examples, the platform-provider response message 416 is generated in accordance with a standardized response message format.

In some embodiments, the platform-provider response message 416 is a data entity that describes a platform-provider communication from a platform system to a provider system 304. A platform-provider response message 416 may include one or more API based messages that may be provided from a platform system through a provider-platform interface 308 to the provider system 304. In some examples, the platform-provider response message 416 may include a response to a service provider request that identified a primary coverage portion, a secondary coverage portion, and/or a remaining portion of the provider service request. In some examples, with reference to a COB-based network domain, the platform-provider response message 416 may include electronic remittance advice (ERA), such an 835 message, that provides claim payment information and documents an electronic funds transfer from one or more insures to a healthcare provider in response to an 837 request. In some examples, the platform-provider response message 416 may be generated in accordance with a standardized response message format that is recognizable by the provider system 304.

In some embodiments, the standardized response message format is a message format for a platform-provider communication, such as platform-provider response message 416. A standardized response message format may include any messaging format that is recognizable (e.g., readable, etc.) by one or more provider systems 304 within a network domain. By way of example, with reference to a COB-based network domain, a standardized request message format may include an electronic data interchange (EDI) 835 file, and/or the like that may confirm payment of a primary and/or secondary claim balance.

In some embodiments, the platform-provider response message 416 is provided to the provider system 304. For instance, the designated coverage platform 402 (and/or an intermediary message filtering computing system, etc.) may provide the platform-provider response message 416 to the provider system 304.

In this manner, using some of the techniques of the present disclosure, multifaceted interfaces may be leveraged to automatically process service requests that involve complex entity-entity relationships. These relationships, for example, may be expressed as hierarchical coverage relationships in which primary, secondary, tertiary, or the like relationships govern responsibly over a provider service request. Traditionally, such relationships increase the burden on all of the entities within a network domain because the constrained and limited network interfaces between the entities prevent collaboration. An example of the hierarchical coverage relationship will now further be described with reference to FIG. 5.

Figure 5:
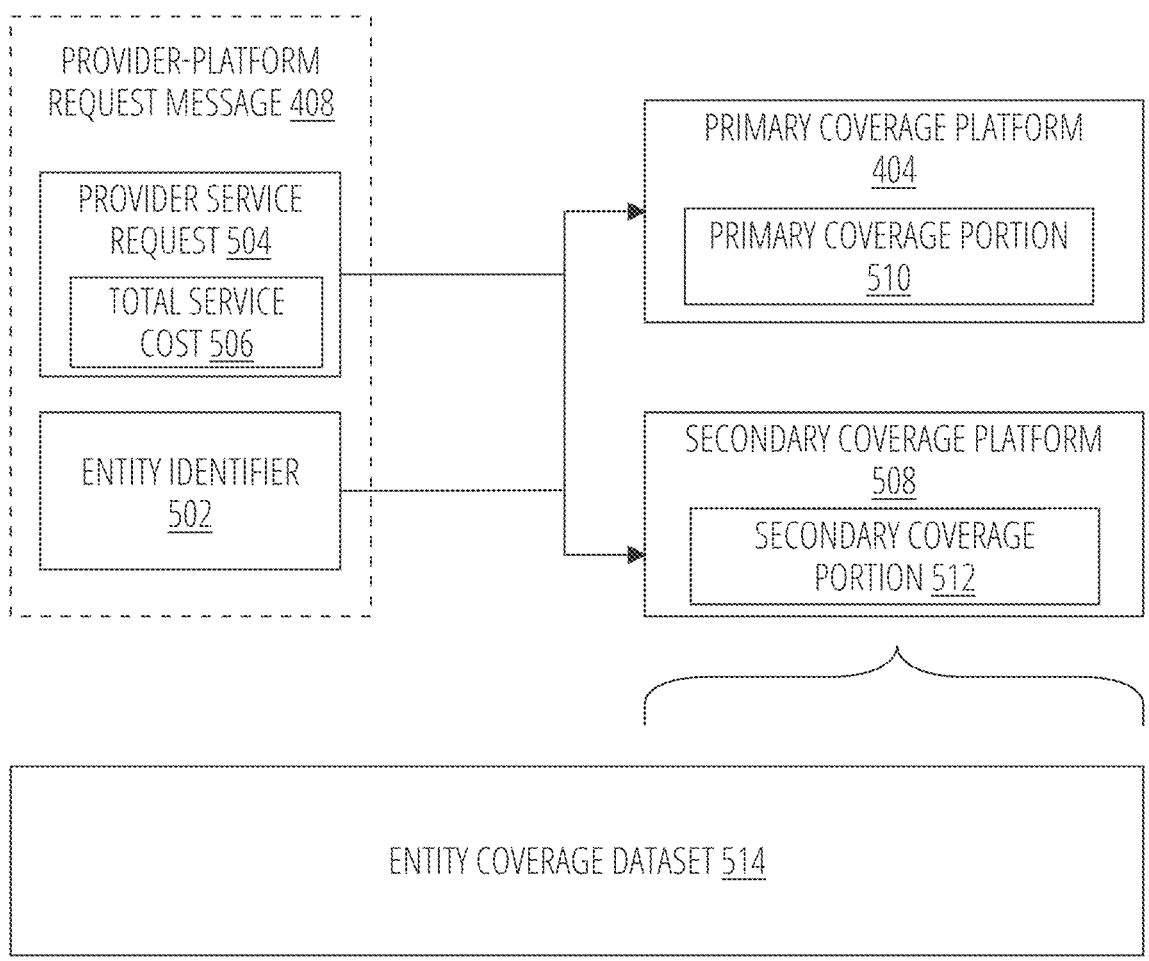
FIG. 5 is an operational example of a hierarchical coverage relationship in accordance with some embodiments discussed herein.

FIG. 5 is an operational example 500 of a hierarchical coverage relationship in accordance with some embodiments discussed herein. The hierarchical coverage relationship may be applicable to any network domain. As one example, the hierarchical coverage relationship may represent a healthcare relationship in which a member entity is covered for healthcare services by multiple coverage platforms that form a primary-secondary coverage relationship with the member entity with respect to a provider service request 504.

The operational example 500 depicts an example provider-platform request message 408 that includes a provider service request 504 and an entity identifier 502. The entity identifier 502 and the provider service request 504 may be leverage to identify a hierarchical coverage relationship with respect to a total service cost 506 of a service corresponding to the provider service request 504. The hierarchical coverage relationship may include a primary coverage platform 404 that is responsible for a primary coverage portion 510 of the total service cost 506 and a secondary coverage platform 508 that is responsible for a secondary coverage portion 512 of the total service cost 506.

In some embodiments, the hierarchical coverage relationship is identified for the provider service request 504 based on the entity identifier 502. For instance, the hierarchical coverage relationship may be identified based on a comparison between the entity identifier 502 and an entity coverage dataset 514.

In some embodiments, the entity identifier 502 is a unique data element that identifies a member entity. An entity identifier 502, for example, may include an alpha-numeric reference, such as a subscriber number, member number, and/or the like that corresponds to a member entity. An entity identifier 502 may include a platform-specific identifier that is assigned and/or interpretable by a specific platform system. In addition, or alternatively, an entity identifier 502 may include a platform-agnostic identifier that is interpretable by a plurality of platform systems within a network domain.

In some embodiments, the entity coverage dataset 514 is continuously updated as coverage information for a plurality of member entities within a network domain is uncovered. Such information, for example, may be recorded through member interactions (e.g., communications from members that update their coverages, etc.), member investigations (e.g., manual and/or automated COB investigations, etc.), historical coverage interactions (e.g., historical claim denials, acceptances, etc. by one or more platform entities), and/or the like. In this way, the entity coverage dataset 514 may provide up-to-date member-platform relationship information that may be leveraged to identify a platform entity's relationship with respect to a provider service request for a particular member.

Using some of the techniques of the present disclosure, hierarchical coverage relationships, such as those shown in the operational example 500, may be efficiently handled through the intelligent collaboration between entities within a network domain. This, in turn, results in practical, real work impacts to complex network domain. An example of one such network domain will now further be described with reference to FIG. 6.

Figure 6:
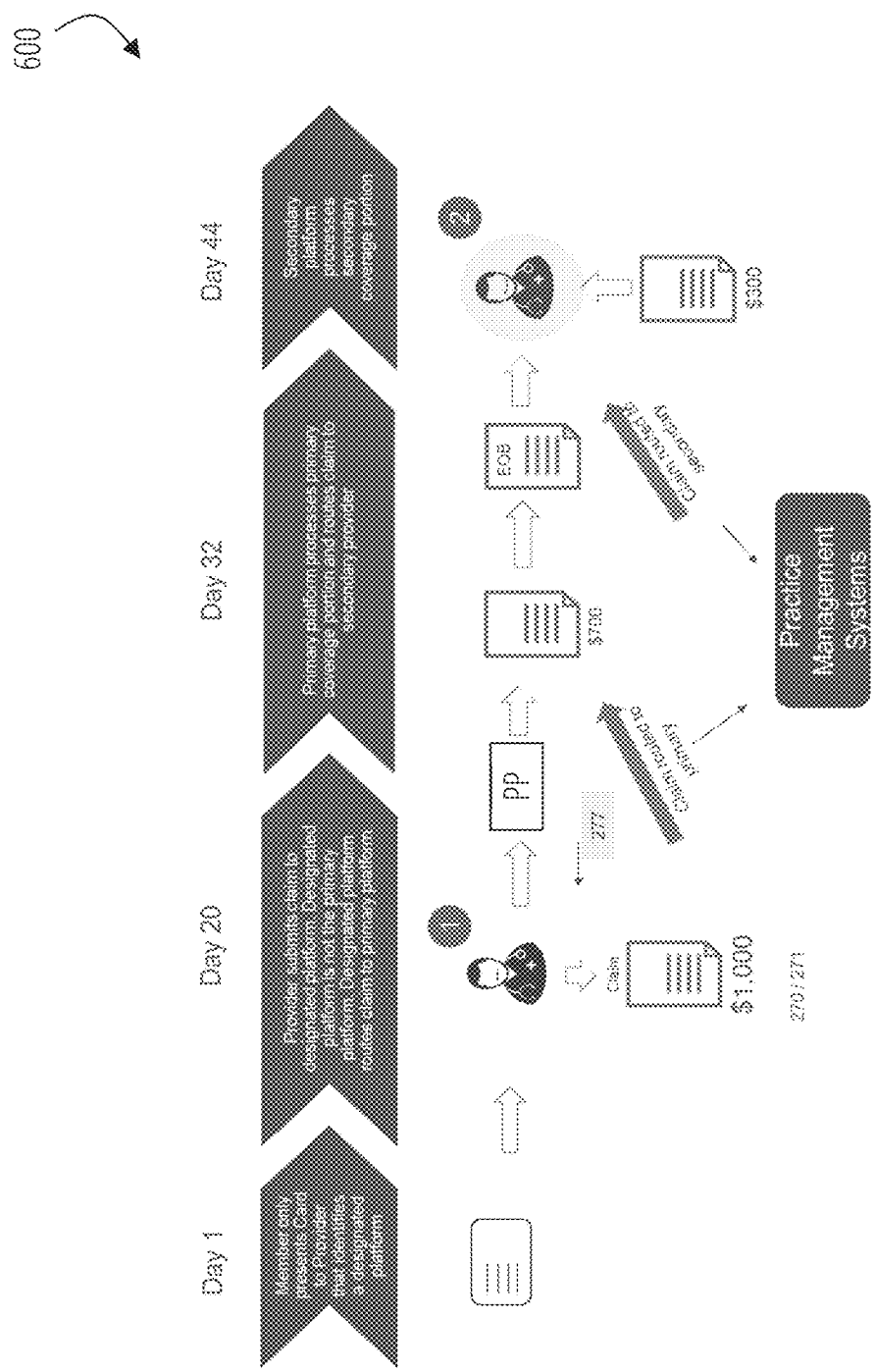
FIG. 6 is an operational example of a COB-based network domain in accordance with some embodiments discussed herein.

FIG. 6 is an operational example 600 of a COB-based network domain in accordance with some embodiments discussed herein. The operational example 600 depicts an example implementation of some of the techniques of the present disclosure to provide real world improvements for traditional COB-based network domains.

By way of example, in traditional COB-based network domains, communications are limited to two-way exchanges between a provider system and a platform system. In the event of a designation error, a platform system traditionally returns a provider service request back to a provider system with an indication that the platform system in not a primary coverage platform. The provider system then restarts the process by sending another message to the primary coverage platform. Once processed by the primary coverage platform, the provider system receives another message that indicates a primary coverage portion of the provider service request. In response, the provider system sends yet another message to a secondary coverage platform. The secondary coverage platform processes the message and returns a final claim resolution. Each of these steps place burden on both the platform and provider systems involved, while increasing the number of messages, processing resources, and memory storage required to facilitate the provider service.

As shown in the operational example 600, using some of the techniques of the present disclosure, the traditional messaging process may be simplified by leveraging multi-faceted interfaces to allow communication and collaboration between multiple platforms involved with a provider service request. For instance, in a COB-based network domain, a member entity may present a card to a healthcare provider that identifies a designated coverage platform. In response, the healthcare provider, via a provider system, may submit a claim to the designated coverage platform. In the event that the designated coverage platform is not the primary coverage platform, the designated coverage platform may route, using a cross-platform interface, the claim to the primary coverage platform. The primary coverage platform may process a primary coverage portion of the claim and then reroute, using the cross-platform interface, the claim, with the primary coverage portion information, to a secondary coverage platform. The secondary coverage platform may process the secondary coverage portion and return the final claim resolution to the provider system. In this way, using the new interfaces of the present disclosure, a traditional COB-based network process may be simplified, thereby reducing processing resources, storage requirements, and temporal burdens on entities involved in the process.

Figure 7:
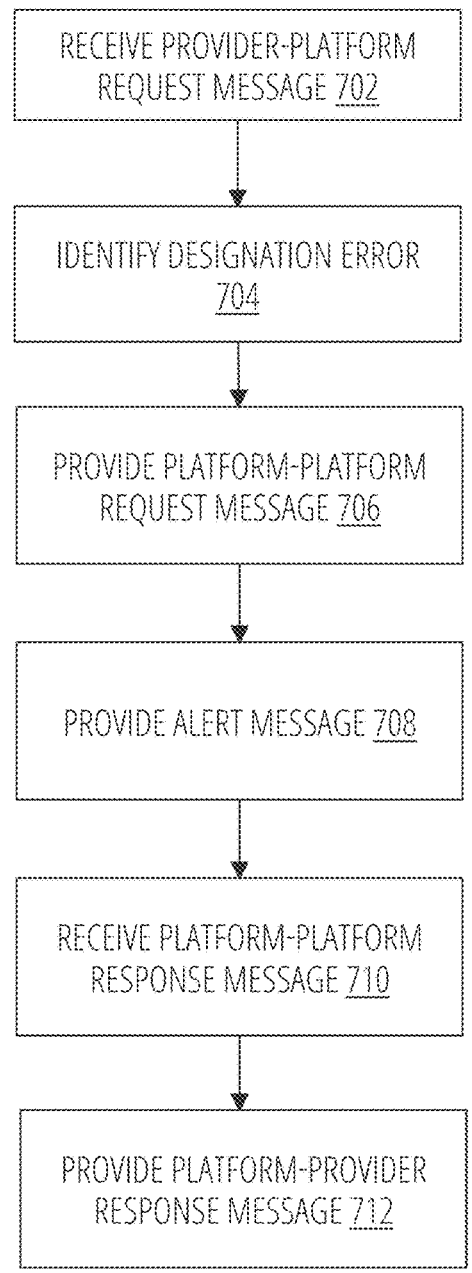
FIG. 7 is a flowchart diagram of an example messaging process for intelligently routing a message between entities within a network domain in accordance with some embodiments discussed herein.

FIG. 7 is a flowchart diagram of an example messaging process 700 for intelligently routing a message between entities within a network domain in accordance with some embodiments discussed herein. The flowchart depicts a messaging process 700 for improving communication exchanges within a complex network domain. The process 700 may be implemented by one or more computing devices, entities, and/or systems described herein. For example, via the various steps/operations of the process 700, the computing system 100 may leverage improved interfaces and message filtering and routing techniques to automatically and intelligently route messages between various entities within a network domain. By doing so, the process 700 accommodates for complex hierarchical entity relationships within a network domain. This, in turn, improves the network efficiency and allocation of computing resources within a complex computing network.

FIG. 7 illustrates an example process 700 for explanatory purposes. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

In some embodiments, the process 700 includes, at step/operation 702, receiving a provider-platform request message. For example, a computing system 100 may receive, originating from a provider system, a provider-platform request message that identifies a provider service request and a designated coverage platform corresponding to the provider service request. In some examples, the provider service request may be a medical claim.

In some embodiments, the process 700 includes, at step/operation 704, identifying a designation error. For example, the computing system 100 may identify the designation error. In some examples, the designation error may be based on a comparison between a primary coverage platform and the designated coverage platform. For instance, the computing system 100 may identify the primary coverage platform corresponding to the provider service request. In some examples, the computing system 100 may identify an entity identifier from the provider-platform request message. The computing system 100 may access an entity coverage dataset associated with the designated coverage platform and identify, using the entity coverage dataset, the primary coverage platform based on the entity identifier and the provider service request.

In some embodiments, the process 700 includes, at step/operation 706, providing a platform-platform request message. For example, the computing system 100 may provide, to a primary coverage platform using a cross-platform interface, the platform-platform request message in response to an identification of the designation error associated with the designated coverage platform. The platform-platform request message may identify the provider service request. In some examples, the computing system 100 may generate, in accordance with a standardized request message format, the platform-platform request message. In this manner, the computing system 100 may reroute the provider service request to a correct platform on behalf of the provider system; thereby, reducing redundant messages between the provider system and the various platforms within a network domain.

In some embodiments, the process 700 includes, at step/operation 708, providing an alert message. For example, the computing system 100 may provide, using a provider-platform interface, the alert message to the provider system. In some examples, the computing system 100 may generate, in accordance with a standardized alert message format, the alert message. For instance, the alert message may include a message status response.

In some embodiments, the process 700 includes, at step/operation 710, receiving a platform-platform response message. For example, the computing system 100 may receive, via the cross-platform interface, a platform-platform response message that identifies a primary coverage portion of the provider service request.

In some embodiments, the process 700 includes, at step/operation 712, providing a platform-provider response message. For example, the computing system 100 may provide the platform-provider response message. In some examples, the computing system 100 may determine a secondary coverage portion for the provider service request. The computing system 100 may generate the platform-provider response message based on the primary coverage portion and the secondary coverage portion and provide the platform-provider response message to the provider system. By way of example, the platform-provider response message may identify the primary coverage portion, the secondary coverage portion, and/or a remainder portion of the provider service request. In some examples, the computing system 100 may generate the platform-provider response message in accordance with a standardized response message format.

Some techniques of the present disclosure enable the generation of action outputs that may be performed to initiate one or more real world actions to achieve real-world effects. The message filtering and routing techniques of the present disclosure may be used, applied, and/or otherwise leveraged to collaboratively process messages, which may help in the resolution of messages within complex network domains. The resolution of a messages may trigger the performance of various computing tasks that improve the performance of a computing system (e.g., a computer itself, etc.) with respect to various actions performed by the computing system 100. Example actions may include the display, transmission, and/or the like of data reflective of message resolution, such as alerts of a COB outcome for a member, and/or the like. Moreover, the actions may include physical actions, such as an allocation of currency, mailing of a physical letter, and/or the like, that may be triggered in response to the resolution of a message.

In some examples, the computing tasks may include actions that may be based on a network domain. A network domain may include any environment in which computing systems may be applied to communicate messages and initiate the performance of computing tasks responsive to the messages. These actions may cause real-world changes, for example, by controlling a hardware component, providing alerts, interactive actions, and/or the like. For instance, actions may include the initiation of automated instructions across and between devices, automated notifications, automated scheduling operations, automated precautionary actions, automated security actions, automated data processing actions, and/or the like.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. For example, via the various steps/operations of the below examples, a computing system may leverage improved interfaces and message filtering and routing techniques to automatically and intelligently route messages between various entities within a network domain. The examples are provided for explanatory purposes. Although the examples outline a particular sequence of steps/operations, each sequence may be altered without departing from the scope of the present disclosure. For example, some of the steps/operations depicted may be performed in parallel or in a different sequence that does not materially impact the function of the various examples. In other examples, different components of an example device or system that implements a particular example may perform functions at substantially the same time or in a specific sequence.

Example 1. A computer-implemented method, the computer-implemented method comprising receiving, by one or more processors and originating from a provider system, a provider-platform request message that identifies a provider service request and a designated coverage platform corresponding to the provider service request; and in response to an identification of a designation error associated with the designated coverage platform, (i) providing to a primary coverage platform, by the one or more processors and using a cross-platform interface, a platform-platform request message that identifies the provider service request; and (ii) providing, by the one or more processors, an alert message to the provider system.

Example 2. The computer-implemented method of example 1, further comprising identifying the primary coverage platform corresponding to the provider service request.

Example 3. The computer-implemented method of example 2, wherein identifying the primary coverage platform comprises identifying an entity identifier from the provider-platform request message; accessing an entity coverage dataset associated with the designated coverage platform; and identifying, using the entity coverage dataset, the primary coverage platform based on the entity identifier and the provider service request.

Example 4. The computer-implemented method of any of the preceding examples, wherein the designation error is based on a comparison between the primary coverage platform and the designated coverage platform.

Example 5. The computer-implemented method of any of the preceding examples, further comprising receiving, via the cross-platform interface, a platform-platform response message that identifies a primary coverage portion of the provider service request; determining a secondary coverage portion for the provider service request; generating a platform-provider response message based on the primary coverage portion and the secondary coverage portion; and providing the platform-provider response message to the provider system.

Example 6. The computer-implemented method of example 5, wherein the platform-provider response message identifies the primary coverage portion, the secondary coverage portion, and a remainder portion of the provider service request.

Example 7. The computer-implemented method of examples 5 or 6, wherein providing the platform-provider response message to the provider system comprises generating, in accordance with a standardized response message format, the platform-provider response message.

Example 8. The computer-implemented method of any of the preceding examples, wherein providing, using the cross-platform interface, the platform-platform request message comprises generating, in accordance with a standardized request message format, the platform-platform request message.

Example 9. The computer-implemented method of any of the preceding examples, wherein providing the alert message to the provider system comprises generating, in accordance with a standardized alert message format, the alert message, wherein the alert message comprises a message status response.

Example 10. The computer-implemented method of any of the preceding examples, wherein the provider service request is a medical claim.

Example 11. A computing system comprising memory and one or more processors communicatively coupled to the memory, the one or more processors configured to receive, originating from a provider system, a provider-platform request message that identifies a provider service request and a designated coverage platform corresponding to the provider service request; and in response to an identification of a designation error associated with the designated coverage platform, (i) provide to a primary coverage platform, using a cross-platform interface, a platform-platform request message that identifies the provider service request; and (ii) provide an alert message to the provider system.

Example 12. The computing system of example 11, wherein the one or more processors are further configured to identify the primary coverage platform corresponding to the provider service request.

Example 13. The computing system of example 12, wherein identifying the primary coverage platform comprises identifying an entity identifier from the provider-platform request message; accessing an entity coverage dataset associated with the designated coverage platform; and identifying, using the entity coverage dataset, the primary coverage platform based on the entity identifier and the provider service request.

Example 14. The computing system of any of examples 11 through 13, wherein the designation error is based on a comparison between the primary coverage platform and the designated coverage platform.

Example 15. The computing system of any of examples 11 through 14, wherein the one or more processors are further configured to receive, via the cross-platform interface, a platform-platform response message that identifies a primary coverage portion of the provider service request; determine a secondary coverage portion for the provider service request; generate a platform-provider response message based on the primary coverage portion and the secondary coverage portion; and provide the platform-provider response message to the provider system.

Example 16. The computing system of example 15, wherein the platform-provider response message identifies the primary coverage portion, the secondary coverage portion, and a remainder portion of the provider service request.

Example 17. The computing system of examples 15 or 16, wherein providing the platform-provider response message to the provider system comprises generating, in accordance with a standardized response message format, the platform-provider response message.

Example 18. One or more non-transitory computer-readable storage media including instructions that, when executed by one or more processors, cause the one or more processors to receive, originating from a provider system, a provider-platform request message that identifies a provider service request and a designated coverage platform corresponding to the provider service request; and in response to an identification of a designation error associated with the designated coverage platform, (i) provide to a primary coverage platform, using a cross-platform interface, a platform-platform request message that identifies the provider service request; and (ii) provide an alert message to the provider system.

Example 19. The one or more non-transitory computer-readable storage media of example 18, wherein providing, using the cross-platform interface, the platform-platform request message comprises generating, in accordance with a standardized request message format, the platform-platform request message.

Example 20. The one or more non-transitory computer-readable storage media of examples 18 or 19, wherein providing the alert message to the provider system comprises generating, in accordance with a standardized alert message format, the alert message, wherein the alert message comprises a message status response.

The invention claimed is:

1. A computer-implemented method comprising:
   receiving, by one or more processors and originating from a provider system, a provider-platform request message that identifies a provider service request and a designated coverage platform corresponding to the provider service request; and
   in response to an identification of a designation error associated with the designated coverage platform,
   (i) providing to a primary coverage platform, by the one or more processors and using a cross-platform interface, a platform-platform request message that identifies the provider service request; and
   (ii) providing, by the one or more processors, an alert message to the provider system, wherein the alert message comprises a message status response that identifies the primary coverage platform and comprises a notification that the provider service request has been forwarded to the primary coverage platform.

2. The computer-implemented method of claim 1, further comprising identifying the primary coverage platform corresponding to the provider service request.

3. The computer-implemented method of claim 2, wherein identifying the primary coverage platform comprises:
   identifying an entity identifier from the provider-platform request message;
   accessing an entity coverage dataset associated with the designated coverage platform; and
   identifying, using the entity coverage dataset, the primary coverage platform based on the entity identifier and the provider service request.

4. The computer-implemented method of claim 1, wherein the designation error is based on a comparison between the primary coverage platform and the designated coverage platform.

5. The computer-implemented method of claim 1, further comprising:
   receiving, via the cross-platform interface, a platform-platform response message that identifies a primary coverage portion of the provider service request;
   determining a secondary coverage portion for the provider service request;
   generating a platform-provider response message based on the primary coverage portion and the secondary coverage portion; and
   providing the platform-provider response message to the provider system.

6. The computer-implemented method of claim 5, wherein the platform-provider response message identifies the primary coverage portion, the secondary coverage portion, and a remainder portion of the provider service request.

7. The computer-implemented method of claim 5, wherein providing the platform-provider response message to the provider system comprises:
   generating, in accordance with a standardized response message format, the platform-provider response message.

8. The computer-implemented method of claim 1, wherein providing, using the cross-platform interface, the platform-platform request message comprises:
   generating, in accordance with a standardized request message format, the platform-platform request message.

9. The computer-implemented method of claim 1, wherein the alert message is generated in accordance with a standardized alert message format.

10. The computer-implemented method of claim 1, wherein the provider service request is a medical claim.

11. A system comprising:
    one or more processors; and
    at least one memory storing processor-executable instructions that, when executed by any one or more of the one or more processors, causes the one or more processors to perform operations comprising:
    receiving, originating from a provider system, a provider-platform request message that identifies a provider service request and a designated coverage platform corresponding to the provider service request; and
    in response to an identification of a designation error associated with the designated coverage platform,
    (i) providing to a primary coverage platform, using a cross-platform interface, a platform-platform request message that identifies the provider service request; and
    (ii) providing an alert message to the provider system, wherein the alert message comprises a message status response that identifies the primary coverage platform and comprises a notification that the provider service request has been forwarded to the primary coverage platform.

12. The system of claim 11, wherein the operations further comprise:
    identifying the primary coverage platform corresponding to the provider service request.

13. The system of claim 12, wherein identifying the primary coverage platform comprises:
    identifying an entity identifier from the provider-platform request message;
    accessing an entity coverage dataset associated with the designated coverage platform; and
    identifying, using the entity coverage dataset, the primary coverage platform based on the entity identifier and the provider service request.

14. The system of claim 11, wherein the designation error is based on a comparison between the primary coverage platform and the designated coverage platform.

15. The system of claim 11, wherein the operations further comprise:
    receiving, via the cross-platform interface, a platform-platform response message that identifies a primary coverage portion of the provider service request;
    determining a secondary coverage portion for the provider service request;
    generating a platform-provider response message based on the primary coverage portion and the secondary coverage portion; and
    providing the platform-provider response message to the provider system.

16. The system of claim 15, wherein the platform-provider response message identifies the primary coverage portion, the secondary coverage portion, and a remainder portion of the provider service request.

17. The system of claim 15, wherein providing the platform-provider response message to the provider system comprises:
    generating, in accordance with a standardized response message format, the platform-provider response message.

18. One or more non-transitory computer-readable storage media including instructions that, when executed by one or more processors, cause the one or more processors to:

receive, originating from a provider system, a provider-platform request message that identifies a provider service request and a designated coverage platform corresponding to the provider service request; and in response to an identification of a designation error associated with the designated coverage platform, (i) provide to a primary coverage platform, using a cross-platform interface, a platform-platform request message that identifies the provider service request; and (ii) provide an alert message to the provider system, wherein the alert message comprises a message status response that identifies the primary coverage platform and comprises a notification that the provider service request has been forwarded to the primary coverage platform.

19. The one or more non-transitory computer-readable storage media of claim 18, wherein providing, using the cross-platform interface, the platform-platform request message comprises:

generating, in accordance with a standardized request message format, the platform-platform request message.

20. The one or more non-transitory computer-readable storage media of claim 18, wherein the alert message is generated in accordance with a standardized alert message format.

* * * * *